(12) United States Patent
Hiramatsu et al.

(10) Patent No.: US 9,105,400 B2
(45) Date of Patent: Aug. 11, 2015

(54) CERAMIC ELECTRONIC COMPONENT INCLUDING INTERNAL ELECTRODE WITH THICK SECTION

(71) Applicant: Murata Manufacturing Co., Ltd., Nagaokakyo-shi, Kyoto-fu (JP)

(72) Inventors: Takashi Hiramatsu, Nagaokakyo (JP); Kunihiko Hamada, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 56 days.

(21) Appl. No.: 13/914,936

(22) Filed: Jun. 11, 2013

(65) Prior Publication Data

US 2013/0329338 A1  Dec. 12, 2013

(30) Foreign Application Priority Data

Jun. 12, 2012  (JP) .................................. 2012-132725

(51) Int. Cl.
| | |
|---|---|
| *H01G 4/005* | (2006.01) |
| *H01G 4/30* | (2006.01) |
| *H01G 4/008* | (2006.01) |
| *H01G 4/012* | (2006.01) |
| *H01G 4/232* | (2006.01) |

(52) U.S. Cl.
CPC ............. *H01G 4/005* (2013.01); *H01G 4/0085* (2013.01); *H01G 4/012* (2013.01); *H01G 4/232* (2013.01); *H01G 4/30* (2013.01)

(58) Field of Classification Search
CPC ....... H01G 4/005; H01G 4/012; H01G 4/232; H01G 4/0085; H01G 4/30

USPC ...................... 361/321.2, 301.4, 303
See application file for complete search history.

(56) References Cited

U.S. PATENT DOCUMENTS

| | | | | |
|---|---|---|---|---|
| 4,584,628 | A * | 4/1986 | Cichanowski | 361/309 |
| 6,383,323 | B1 * | 5/2002 | Wada et al. | 156/89.14 |
| 7,430,105 | B2 * | 9/2008 | Okuyama | 361/303 |
| 8,264,815 | B2 * | 9/2012 | Yun et al. | 361/311 |
| 8,587,920 | B2 * | 11/2013 | Lee et al. | 361/301.4 |
| 2010/0008017 | A1 * | 1/2010 | Ito et al. | 361/301.4 |
| 2010/0085682 | A1 * | 4/2010 | Abe et al. | 361/303 |

FOREIGN PATENT DOCUMENTS

| | | | |
|---|---|---|---|
| JP | 05304042 | A * | 11/1993 |
| JP | 5-335175 | A | 12/1993 |
| JP | 09069463 | A * | 3/1997 |
| JP | 10050548 | A * | 2/1998 |
| JP | 2000-21679 | A | 1/2000 |
| JP | 2002353068 | A * | 12/2002 |

(Continued)

OTHER PUBLICATIONS

Official Communication issued in corresponding Japanese Patent Application No. 2012-132725, mailed on Feb. 3, 2015.

*Primary Examiner* — David M Sinclair
(74) *Attorney, Agent, or Firm* — Keating & Bennett, LLP

(57) ABSTRACT

In a ceramic electronic component, a section of a first extraction section located closer to a first end surface defines a first thick section. The first thick section is at least about 1.5 times as thick as a first central section of a first opposed section in a direction. The length of the first thick section is within the range of about ¼ to about ¾ of a distance from a tip of a second opposed section closer to the first end surface, to the first end surface in the direction.

14 Claims, 4 Drawing Sheets

(56) References Cited

FOREIGN PATENT DOCUMENTS

| JP | 2005259772 | A | * | 9/2005 |
| JP | 2006-332601 | A | | 12/2006 |
| JP | 2007-234677 | A | | 9/2007 |
| JP | 2010041030 | A | * | 2/2010 |
| JP | 2010093136 | A | * | 4/2010 |

* cited by examiner

CERAMIC ELECTRONIC COMPONENT INCLUDING INTERNAL ELECTRODE WITH THICK SECTION

BACKGROUND OF THE INVENTION

1. Field of the Invention

The present invention relates to a ceramic electronic component.

2. Description of the Related Art

Conventionally, ceramic electronic components, such as ceramic capacitors, have been used for various applications. For example, JP 2006-332601 A discloses, as an example, a laminated ceramic capacitor in which an internal electrode is thicker in an electrode extraction section than in a capacitance generation section. In the laminated ceramic capacitor disclosed in JP 2006-332601 A, the relatively thick electrode extraction section is partially overlapped with a relatively thin capacitance generation section in the length direction.

In recent years, there is has been a demand to further improve the performance of ceramic electronic components.

SUMMARY OF THE INVENTION

Preferred embodiments of the present invention provide a ceramic electronic component having improved performance.

A ceramic electronic component according to a preferred embodiment of the present invention includes a ceramic body, a first internal electrode, and a second internal electrode. The ceramic body includes first and second principal surfaces, first and second side surfaces, and first and second end surfaces. The first internal electrode is provided in the ceramic body and extends in a direction from the first end surface. The second internal electrode is provided in the ceramic body so as to be opposed to the first internal electrode with a ceramic layer interposed therebetween. The second internal electrode extends in a direction from the second end surface. The first internal electrode includes a first opposed section and a first extraction section. The first opposed section is opposed to the second internal electrode with the ceramic layer interposed therebetween. The first extraction section is not opposed to the second internal electrode with the ceramic layer interposed therebetween. The first extraction section is located closer to the first end surface than the first opposed section. The second internal electrode includes a second opposed section and a second extraction section. The second opposed section is opposed to the first opposed section with the ceramic layer interposed therebetween. The second extraction section is not opposed to the first internal electrode with the ceramic layer interposed therebetween. The second extraction section is located closer to the second end surface than the second opposed section. A section of the first extraction section closer to the first end surface defines a first thick section. The first thick section is preferably, for example, at least about 1.5 times as thick as a first central section of the first opposed section. The length of the first thick section is preferably, for example, within the range of about ¼ to about ¾ of the distance from a tip of the second opposed section closer to the first end surface to the first end surface.

The length of the first thick section is more preferably, for example, within the range of about ⅜ to about ⅝ of the distance from the tip of the second opposed section closer to the first end surface to the first end surface.

A section of the second extraction section closer to the second end surface defines a second thick section. The second thick section is preferably, for example, at least about 1.5 times or more as thick as a second central section of the second opposed section. The length of the second thick section is preferably, for example, within the range of about ¼ to about ¾ of the distance from a tip of the first opposed section closer to the second end surface to the second end surface.

The ceramic electronic component may preferably further include a first external electrode and a second external electrode. The first external electrode is arranged over the first end surface. The first external electrode is connected to the first thick section. The second external electrode is arranged over the second end surface. The second external electrode is electrically connected to the second thick section.

According to various preferred embodiments of the present invention, the performance of the ceramic electronic component is significantly improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
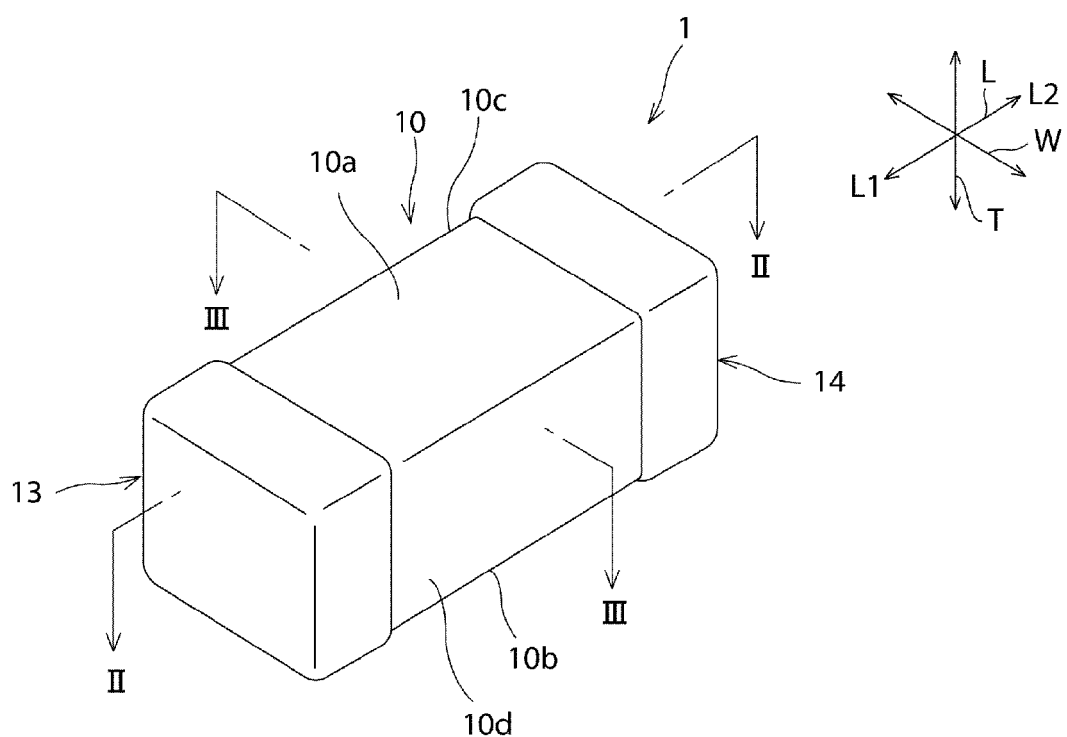
FIG. 1 is a schematic perspective view of a ceramic electronic component according to a preferred embodiment of the present invention.

Examples of a ceramic electronic component according to preferred embodiments of the present invention will be described below. However, the following preferred embodiments are merely provided as non-limiting examples.

In addition, in the drawings, members which have substantially the same functions are referred to by the same symbols. In addition, the drawings are merely schematic. The dimensional ratios of the objects shown in the drawings may be different from the dimensional ratios of the real objects in some cases. The dimensional ratios of the objects may be also different between the drawings in some cases. The specific dimensional ratios of the objects should be determined in view of the following description.

Figure 2:
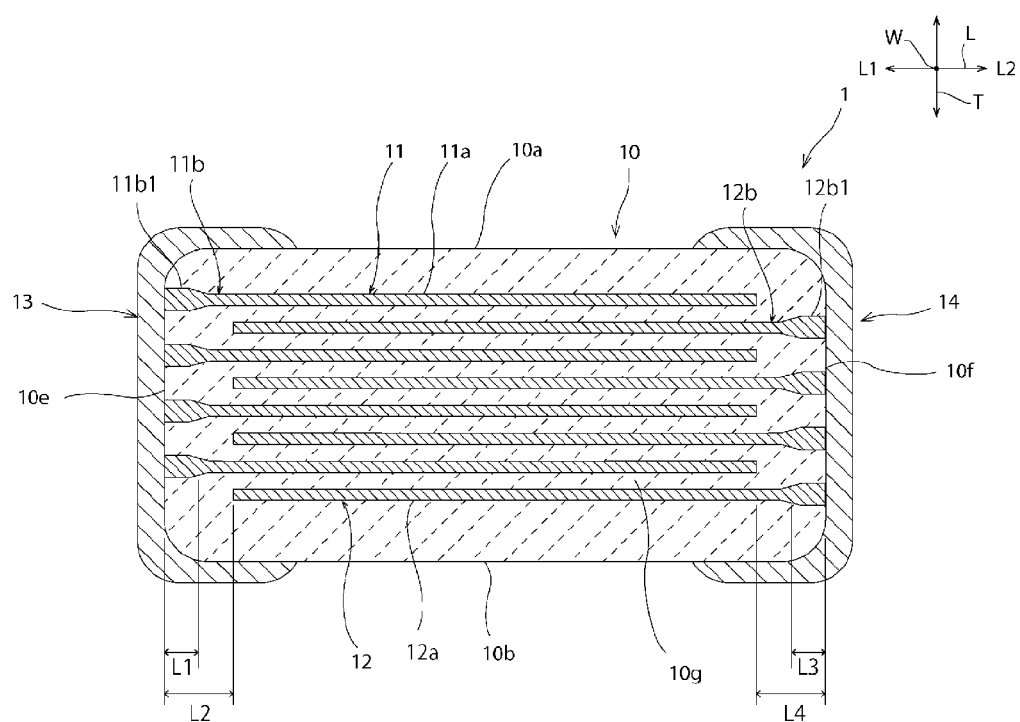
FIG. 2 is a schematic cross-sectional view of a portion along the line II-II of FIG. 1.
Figure 3:
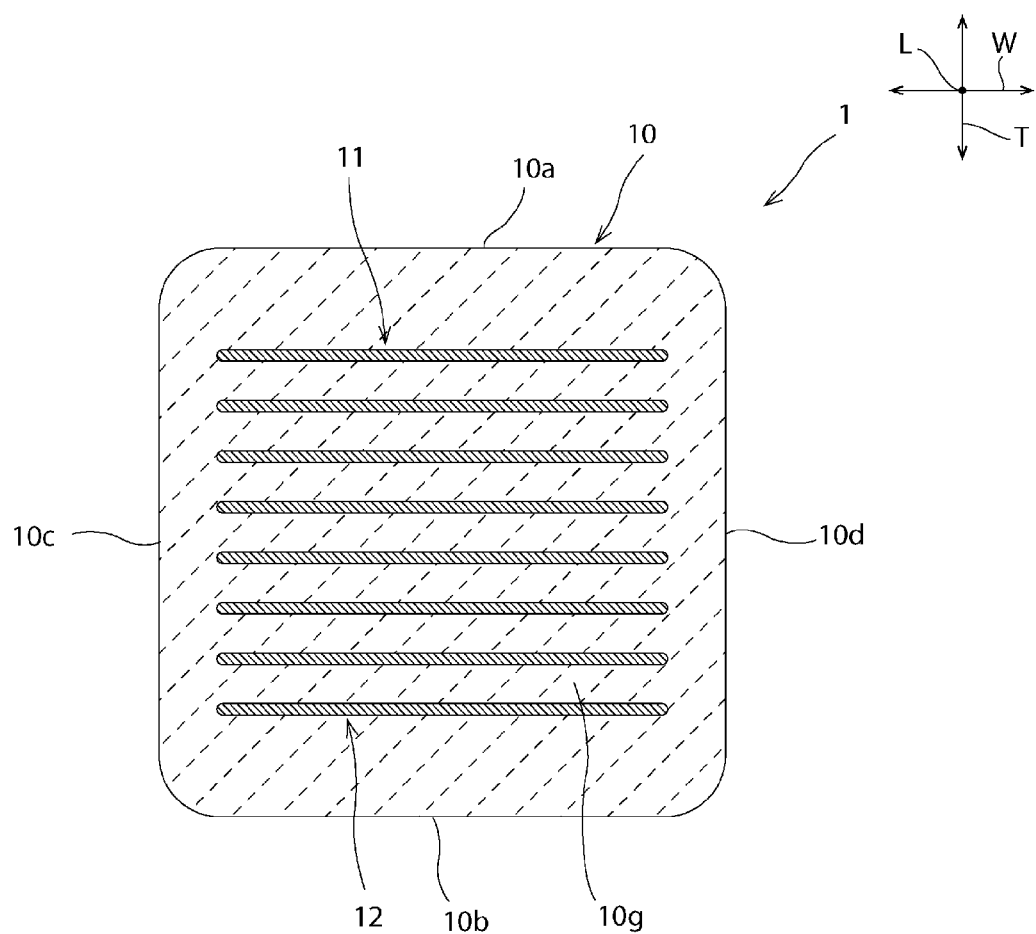
FIG. 3 is a schematic cross-sectional view of a portion along the line III-III of FIG. 1.

FIG. 1 is a schematic perspective view of a ceramic electronic component 1 according to the present preferred embodiment. FIG. 2 is a schematic cross-sectional view of a portion along the line II-II of FIG. 1. FIG. 3 is a schematic cross-sectional view of a portion along the line III-III of FIG. 1.

The ceramic electronic component 1 includes a ceramic body 10. The ceramic body 10 includes first and second end surfaces 10e and 10f (see FIG. 2) that are parallel or substantially parallel to each other. Specifically, the ceramic body 10 preferably has a cuboid or substantially cuboid shape. The ceramic body 10 includes first and second principal surfaces 10a and 10b, first and second side surfaces 10c and 10d, and the first and second end surfaces 10e and 10f. The first and second principal surfaces 10a and 10b each extend in a length direction L and a width direction W. The first principal surface 10a and the second principal surface 10b are parallel or substantially parallel to each other. The first and second side surfaces 10c and 10d each extend in the length direction L and a thickness direction T. The first side surface 10c and the second side surface 10d are parallel or substantially parallel to each other. The first and second end surfaces 10e and 10f each extend in the width direction W and the thickness direction T. The first end surface 10e and the second end surface 10f are parallel or substantially parallel to each other.

It is to be noted that the term "substantially cuboid shape" is meant to include cuboids with chamfered corners and ridge lines, and cuboids with rounded corners and ridge lines.

The ceramic body 10 is made of an appropriate ceramic material. The ceramic material used for the ceramic body 10 is appropriately selected depending on the characteristics of the ceramic electronic component 1.

For example, when the ceramic electronic component 1 is a ceramic capacitor, the ceramic body 10 may preferably be made of a material including a dielectric ceramic as its main constituent. Specific examples of the dielectric ceramic include, for example, $BaTiO_3$, $CaTiO_3$, $SrTiO_3$, and $CaZrO_3$. In addition, for example, accessory constituents such as a Mn compound, a Co compound, a rare-earth compound, and a Si compound may preferably be appropriately added to the ceramic body 10.

As shown in FIGS. 2 and 3, first and second internal electrodes 11 and 12 are provided in the ceramic body 10. The first and second internal electrodes 11 and 12 are respectively provided in a length direction L and a width direction W. The first and second internal electrodes 11 and 12 are opposed to each other, in a thickness direction T with a ceramic layer 10g interposed therebetween.

The first internal electrode 11 is extracted to the first end surface 10e. The first internal electrode 11 extends in the length direction L from the first end surface 10e. The first internal electrode 11 is not extracted to the second end surface 10f or the first or second side surface 10c or 10d.

The second internal electrode 12 is extracted to the second end surface 10f. The second internal electrode 12 extends in the length direction L from the second end surface 10f. The second internal electrode 12 is not extracted to the first end surface 10e or the first or second side surface 10c or 10d. For this reason, each end of the ceramic body 10 in the length direction L includes a region in which only one of the first and second internal electrodes 11 and 12 is provided.

The first internal electrode 11 is connected to a first external electrode 13 as shown in FIGS. 1 and 2. The first external electrode 13 is provided over the first end surface 10e. In the present preferred embodiment, the first external electrode 13 is preferably provided not only over the first end surface 10e, but also over portions of the first and second principal surfaces 10a and 10b and portions of the first and second side surfaces 10c and 10d.

The second internal electrode 12 is connected to a second external electrode 14. The second external electrode 14 is provided over the second end surface 10f. In the present preferred embodiment, the second external electrode 14 is preferably provided not only over the second end surface 10f, but also over portions of the first and second principal surfaces 10a and 10b and portions of the first and second side surfaces 10c and 10d.

The first and second internal electrodes 11 and 12 and the first and second external electrodes 13 and 14 are each made of an appropriate conductive material. Specifically, the first and second internal electrodes 11 and 12 and the first and second external electrodes 13 and 14 may each preferably be made of, for example, at least one of Ni, Cu, Ag, Pd, Au, Pt, Sn, or other suitable conductive material, for example. The first and second external electrodes 13 and 14 may each preferably be made of, for example, a laminated body of more than one conductive layer.

As shown in FIG. 2, the first internal electrode 11 includes a first opposed section 11a and a first extraction section 11b. The first extraction section 11b is located closer to the first end surface 10e (L1) than the first opposed section 11a. The first internal electrode 11 is electrically connected to the first external electrode 13 at the first extraction section 11b.

The second internal electrode 12 includes a second opposed section 12a and a second extraction section 12b.

The second extraction section 12b is located closer to the second end surface 10f (L2 side) than the second opposed section 12a. The second internal electrode 12 is electrically connected to the second external electrode 14 at the second extraction section 12b.

The first opposed section 11a and the second opposed section 12a are opposed to each other with the ceramic layer 10g interposed therebetween. The first extraction section 11b is located closer to the first end surface 10e (L1 side) than a tip of the second internal electrode 12 closer. For this reason, the first extraction section 11b is not opposed to the second internal electrode 12. The second extraction section 12b is located closer to the second end surface 10f (L2 side) than a tip of the first internal electrode 11. For this reason, the second extraction section 12b is not opposed to the first internal electrode 11.

The first extraction section 11b includes a first thick section 11b1. The first thick section 11b1 is provided in a section of the first extraction section 11b closer to the first end surface 10e (L1 side). More specifically, the section of the first extraction section 11b closer to the first end surface 10e defines the first thick section 11b1. For this reason, the first internal electrode 11 is connected to the first external electrode 13 at the relatively thick first thick section 11b1. Therefore, the electrical connection between the first external electrode 13 and the first internal electrode 11 is improved in terms of reliability.

The first thick section 11b1 is, for example, at least about 1.5 times as thick as a central section (first central section) of the first opposed section 11a in the length direction L. It is to be noted that the maximum thickness of the first thick section 11b1 is preferably about 1.8 to about 2.2 times, and more preferably about 2.0 times as large as the thickness of the central section of the first opposed section 11a in the length direction L. However, if the first thick section 11b1 is excessively thick, delamination may be caused in some cases. Therefore, the maximum thickness of the first thick section 11b1 is preferably about 2.5 times or less as large as the thickness of the central section of the first opposed section 11a in the length direction L.

It is to be noted that in the direction from the first end surface 10e toward the first opposed section 11a, the first thick section 11b1 may include a portion that is less than about 1.5 times and another portion that is at least about 1.5 times as thick as the central section (first central section) of the first opposed section 11a in the length direction L, and in this case, the first thick section 11b1 includes both the portions which is less than about 1.5 times as thick as the central section and the portions which is at least about 1.5 times as thick as the central section.

The second extraction section 12b includes a second thick section 12b1. The second thick section 12b1 is provided in a section of the second extraction section 12b closer to the second end surface 10f (L2 side). More specifically, the section of the second extraction section 12b closer to the second end surface 10f defines the second thick section 12b1. For this reason, the second internal electrode 12 is connected to the second external electrode 14 at the relatively thick second thick section 12b1. Therefore, the electrical connection between the second external electrode 14 and the second internal electrode 12 is improved in terms of reliability.

The second thick section 12b1 is, for example, at least about 1.5 times or more as thick as a central section (second central section) of the second opposed section 12a in the length direction L. It is to be noted that the maximum thickness of the second thick section 12b1 is preferably about 1.8 to about 2.2 times, and more preferably about 2.0 times as large as the thickness of the central section of the second opposed section 12a in the length direction L. However, if the second thick section 12b1 is excessively thick, delamination may be caused in some cases. Therefore, the maximum thickness of the second thick section 12b1 is preferably about 2.5 times or less as large as the thickness of the central section of the second opposed section 12a in the length direction L.

It is to be noted that in the direction from the second end surface 10f toward the second opposed section 12a, the second thick section 12b1 may include a portion that is less than about 1.5 times and a portion that is at least about 1.5 times or more as thick as the central section (first central section) of the second opposed section 12a in the length direction L, and in this case, the second thick section 12b1 includes both the portion which is less than about 1.5 times as thick as the central section and the portion which is at least about 1.5 times or more as thick as the central section.

It is to be noted that the method for manufacturing the ceramic electronic component 1 is not particularly limited. The ceramic electronic component 1 can be manufactured, for example, in the following manner.

Figure 4:
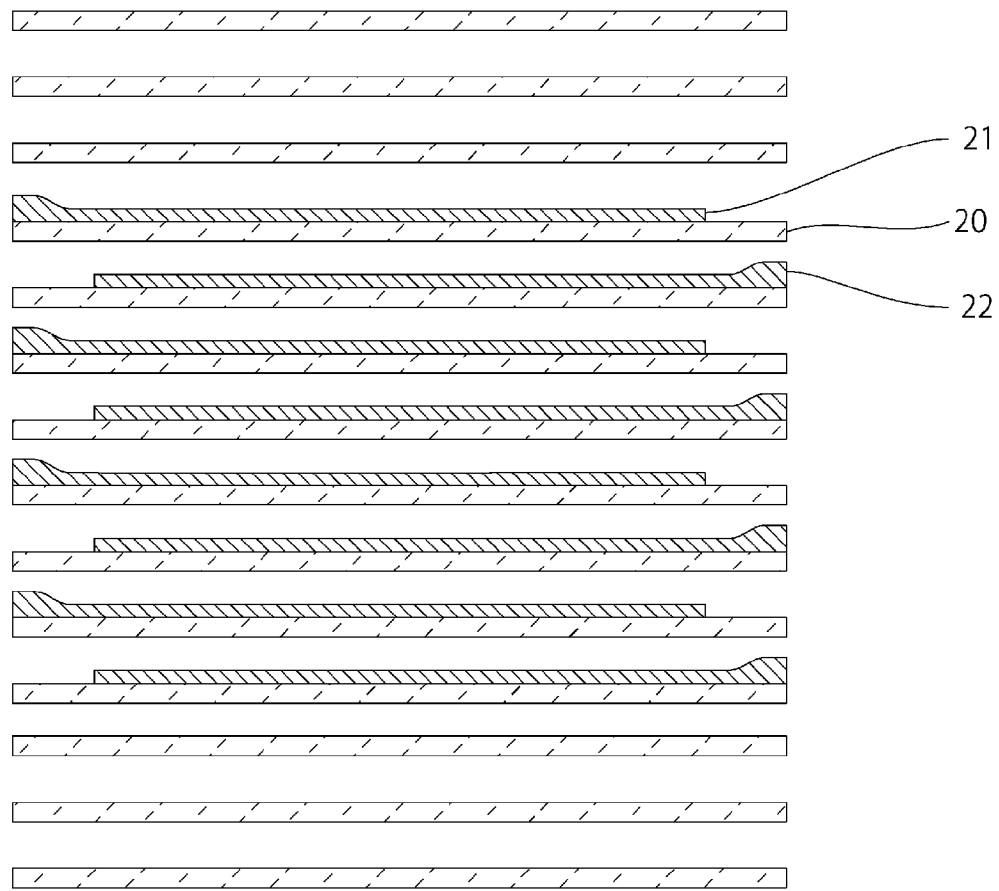
FIG. 4 is a schematic cross-sectional view illustrating a non-limiting example of a method for manufacturing a ceramic electronic component according to a preferred embodiment of the present invention.

First, ceramic green sheets 20 (see FIG. 4) are prepared. The ceramic green sheets 20 can be prepared, for example, by printing a ceramic paste in accordance with a printing method, such as a screen printing method.

Next, a conductive paste is applied onto the ceramic green sheets 20 by a printing method, such as a screen printing method, to form conductive paste layers 21 or 22 for the first or second internal electrodes 11 or 12.

Next, a green sheet laminated body is prepared by appropriately stacking the ceramic green sheets 20 with no conductive paste layers 21 or 22 formed thereon, the ceramic green sheets 20 with the conductive paste layers 21 formed thereon, and the ceramic green sheets 20 with the conductive paste layers 22 formed thereon. After the stacking, the green sheet laminated body may be subjected to pressing.

Next, the green sheet laminated body is subjected to firing to prepare the ceramic body 10 including therein the first and second internal electrodes 11 and 12.

The first and second external electrodes 13 and 14 can be, for example, formed by applying a conductive paste onto the ceramic body 10 to be subjected to firing, or formed by plating. Alternatively, the first and second external electrodes 13 and 14 may be formed by applying a conductive paste onto the green sheet laminated body, and firing the conductive paste layers together with the green sheet laminated body.

As described above, in the present preferred embodiment, the extraction sections 11b and 12b of the first and second internal electrodes 11 and 12 are respectively provided with the thick sections 11b1 and 12b1. For this reason, the difference between the thickness of a section provided with both of the first and second internal electrodes 11 and 12 and the thickness of a section provided with only one of the first and second internal electrodes 11 and 12 in the ceramic electronic component 1 can be significantly reduced.

On the other hand, when the relatively thick electrode extraction section partially overlaps with the relatively thin capacitance generation section in the length direction as described in, for example, JP 2006-332601 A, the overlap will be very thick between the electrode extraction section and the capacitance generation section. For this reason, the difference in thickness is likely to be produced between the overlap of the electrode extraction section with the capacitance generation section and the section provided with only the electrode extraction section. In contrast, in the ceramic electronic component 1, the thick sections 11b1 and 12b1, which are provided in the extraction sections 11b and 12b, do not overlap with the opposed sections 11a and 12a in the thickness direction T. Therefore, the difference in thickness is significantly reduced between the relatively thick section and the relatively thin section in the ceramic electronic component 1.

From the perspective of reducing the difference in thickness between the relatively thick section and the relatively thin section in the ceramic electronic component, the extraction sections may be entirely composed of the thick sections. However, in practice, during the manufacture of the ceramic electronic component, the ceramic green sheets are often misaligned during stacking of the ceramic green sheets. In addition, the ceramic green sheets may also be misaligned during pressing of the green sheet laminated body. For this reason, when the extraction sections are entirely composed of the thick sections, the thick sections may overlap with the opposed sections in some cases. When the thick sections overlap with the opposed sections, the difference in thickness will be increased between the relatively thick section and the relatively thin section in the ceramic electronic component. In addition, because of the thinner ceramic layers between the thick sections and the opposed sections, the dielectric breakdown voltage may be decreased, and the characteristics of the ceramic electronic component may differ from the designed characteristics. For example, when the ceramic electronic component is a ceramic capacitor, the obtained capacitance will differ from the designed capacitance.

In the ceramic electronic component 1, the length L1 of the first thick section 11b1 in the length direction L is preferably within the range of about ¼ to about ¾ of the distance L2 in the length direction L from the tip of the second opposed section 12a closer to the first end surface 10e (L1 side) to the first end surface 10e. The length L3 of the second thick section 12b1 in the length direction L is preferably within the range of about ¼ to about ¾ of the distance L4 in the length direction L from the tip of the first opposed section 11a closer to the second end surface 10f (L2 side) to the second end surface 10f.

It is to be noted that, for example, L1 is preferably at least about ¼ of L2, and L3 is preferably at least about ¼ of L4, because the lengths of at least about ¼ produce the effect of reducing the difference between the thickness of a section provided with both of the first and second internal electrodes 11 and 12 and the thickness of a section provided with only one of the first and second internal electrodes 11 and 12 in the ceramic electronic component 1, that is, the effect of compensating for the difference in level. It is to be noted that, for example, more preferably, L1 is at least about ⅜ of L2 and L3 is at least about ⅜ of L4, because the effect of compensating for the difference in level is more reliably produced.

In addition, for example, L1 is preferably about ¾ or less of L2 and L3 is preferably about ¾ or less of L4, because the lengths of about ¾ or less thereof make the thick sections 11b1 and 12b1 less likely to overlap with the opposed sections 12a and 11a in the thickness direction T, and thus, prevents the generation of the difference in level therein. It is to be noted that, for example, more preferably, L1 is about 5/8 or less of L2 and L3 is about 5/8 or less of L4, because the overlap can be more reliably prevented.

Therefore, while reducing the difference in thickness between the relatively thick section and the relatively thin section in the ceramic electronic component 1, the decrease in dielectric breakdown voltage is prevented, and the characteristics of the ceramic electronic component 1 are maintained close to the designed characteristics.

The lengths (L1, L3) of the thick sections and the distances (L2, L4) between the opposed sections and the end surfaces can be measured at a cross section located in the center in the width direction of the ceramic electronic component, which is exposed by polishing the side surface of the ceramic electronic component. Specifically, in the cross section, the length of the thick section and the distance between the opposed section and the end surface are measured for each of twenty-five layers of internal electrodes in total of the second to twenty-sixth layers from the first principal surface; twenty-five layers of internal electrodes in total of the second to twenty-sixth layers from the second principal surface; and twenty-five layers of internal electrodes located in a central section in the thickness direction, and the average values of the measurements are regarded as the lengths (L1, L3) of the thick sections and the distances (L2, L4) between the opposed sections and the end surfaces.

In addition, the thickness of the central section for the internal electrodes can be obtained by measuring in the cross section, the thickness of the central section in the length direction for each of twenty-five layers of internal electrodes in total of the second to twenty-sixth layers from the first principal surface; twenty-five layers of internal electrodes in total of the second to twenty-sixth layers from the second principal surface; and twenty-five layers of internal electrodes located in a central section in the thickness direction, and calculating the average value of the measurements.

It is to be noted that the thickness of the internal electrodes can also be measured with a scanning electron microscope.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:
   a ceramic body including first and second principal surfaces, first and second side surfaces, and first and second end surfaces;
   a first internal electrode provided in the ceramic body, the first internal electrode extending in a direction from the first end surface; and
   a second internal electrode provided in the ceramic body so as to be opposed to the first internal electrode with a ceramic layer interposed therebetween, the second internal electrode extending in the direction from the second end surface; wherein
   the first internal electrode includes:
      a first opposed section opposed to the second internal electrode with the ceramic layer interposed therebetween; and
      a first extraction section not opposed to the second internal electrode with the ceramic layer interposed therebetween, the first extraction section being located closer to the first end surface than the first opposed section;
   the second internal electrode includes:
      a second opposed section opposed to the first opposed section with the ceramic layer interposed therebetween; and
      a second extraction section not opposed to the first internal electrode with the ceramic layer interposed therebetween, the second extraction section being located closer to the second end surface than the second opposed section;
   a section of the first extraction section located closer to the first end surface includes a first thick section with a maximum thickness within a range of about 1.8 times to about 2.2 times a thickness of a first central section of the first opposed section in the direction;
   a length of the first thick section in the direction is within a range of about 3/8 to about 5/8 of a distance in the direction from a tip of the second opposed section located closer to the first end surface, to the first end surface; and
   the first internal electrode includes a first portion extending from the first thick section toward the first opposed section, and the first portion has a thickness that varies along a length of the first portion from the first thick section toward the first opposed section.

2. The ceramic electronic component according to claim 1, wherein
   a section of the second extraction section closer to the second end surface includes a second thick section with a maximum thickness within a range of about 1.8 times to about 2.2 times a thickness of a second central section of the second opposed section in the direction;
   a length of the second thick section in the direction is within a range of about 3/8 to about 5/8 of a distance in the direction from a tip of the first opposed section closer to the second end surface, to the second end surface; and
   the second internal electrode includes a second portion extending from the second thick section toward the second opposed section, and the second portion has a thickness that varies along a length of the second portion from the second thick section toward the second opposed section.

3. The ceramic electronic component according to claim 2, further comprising:
   a first external electrode provided on the first end surface and connected to the first thick section; and
   a second external electrode provided on the second end surface and electrically connected to the second thick section.

4. The ceramic electronic component according to claim 3, wherein the first and second external electrodes are also provided over portions of the first and second principal surfaces and portions of the first and second side surfaces.

5. The ceramic electronic component according to claim 3, wherein the first and second external electrodes are made of at least one of Ni, Cu, Ag, Pd, Au, Pt, or Sn.

6. The ceramic electronic component according to claim 3, wherein the first and second external electrodes are made of a fired conductive paste.

7. The ceramic electronic component according to claim 3, wherein the first and second external electrodes are made of a plated material.

8. The ceramic electronic component according to claim 1, wherein the ceramic body has a cuboid or substantially cuboid shape.

9. The ceramic electronic component according to claim 1, wherein the ceramic body is made of a dielectric ceramic material.

10. The ceramic electronic component according to claim 1, wherein the ceramic body includes one of $BaTiO_3$, $CaTiO_3$, $SrTiO_3$, or $CaZrO_3$ as a main component.

11. The ceramic electronic component according to claim 10, wherein the ceramic body further includes a Mn compound, a Co compound, a rare-earth compound, or a Si compound as an accessory component.

12. The ceramic electronic component according to claim 1, wherein the first and second internal electrodes are made of at least one of Ni, Cu, Ag, Pd, Au, Pt, or Sn.

13. The ceramic electronic component according to claim 1, wherein the ceramic body is a laminated body including a plurality of conductive layers.

14. The ceramic electronic component according to claim 1, wherein the first and second internal electrodes are not extracted to the first side surface or the second side surface.

* * * * *